United States Patent [19]

Arndt

[11] 4,184,799

[45] Jan. 22, 1980

[54] SETTING AND STACKING ARRANGEMENT

[75] Inventor: Moritz Arndt, Trier, Fed. Rep. of Germany

[73] Assignee: Laeis-Werke AG, Trier, Fed. Rep. of Germany

[21] Appl. No.: 867,879

[22] Filed: Jan. 9, 1978

[30] Foreign Application Priority Data

Jan. 8, 1977 [DE] Fed. Rep. of Germany ....... 2700695

[51] Int. Cl.² .............................................. B65G 57/03
[52] U.S. Cl. ................................ 414/54; 414/34; 414/57; 414/67; 414/71; 414/589; 414/751; 414/783
[58] Field of Search .............. 214/6 R, 6 A, 6 F, 6 G, 214/6 N, 6 P, 6 FS, 1 BB, 1 BT, 1 BC, 1 BH, 1 BD, 1 BV, 147 R, 147 G, 8.5 C, 8.5 D, 6 TS; 414/751, 783, 34, 54, 626, 57, 29, 590, 67, 71, 589, 618

[56] References Cited

U.S. PATENT DOCUMENTS

| 3,113,682 | 12/1963 | Paisley | 214/6 A |
| 3,480,161 | 11/1969 | Bason | 214/6 A |
| 3,586,176 | 6/1971 | Rackman et al. | 214/6 P |
| 3,825,293 | 7/1974 | Schwarz | 214/6 A X |
| 4,032,022 | 6/1977 | Smith | 214/8.5 C |

FOREIGN PATENT DOCUMENTS

| 2220846 | 11/1973 | Fed. Rep. of Germany | 214/8.5 C |
| 250695 | 1/1970 | U.S.S.R. | 214/6 A |

Primary Examiner—Frank E. Werner

[57] ABSTRACT

An improved setting and stacking arrangement for setting and stacking articles in a cross-bracing manner. The arrangement has a gripping mechanism which is movable in a transverse and longitudinal direction and rotatable about a vertical axis and also can be lowered and lifted in a vertical direction. The gripping mechanism includes at least one pair of gripper arms having rotary gripper plates at their free ends. The gripper arms are slidably movable on a guide rod of the gripping mechanism and one gripper plate can be rotated by a rotary drive mechanism.

14 Claims, 5 Drawing Figures

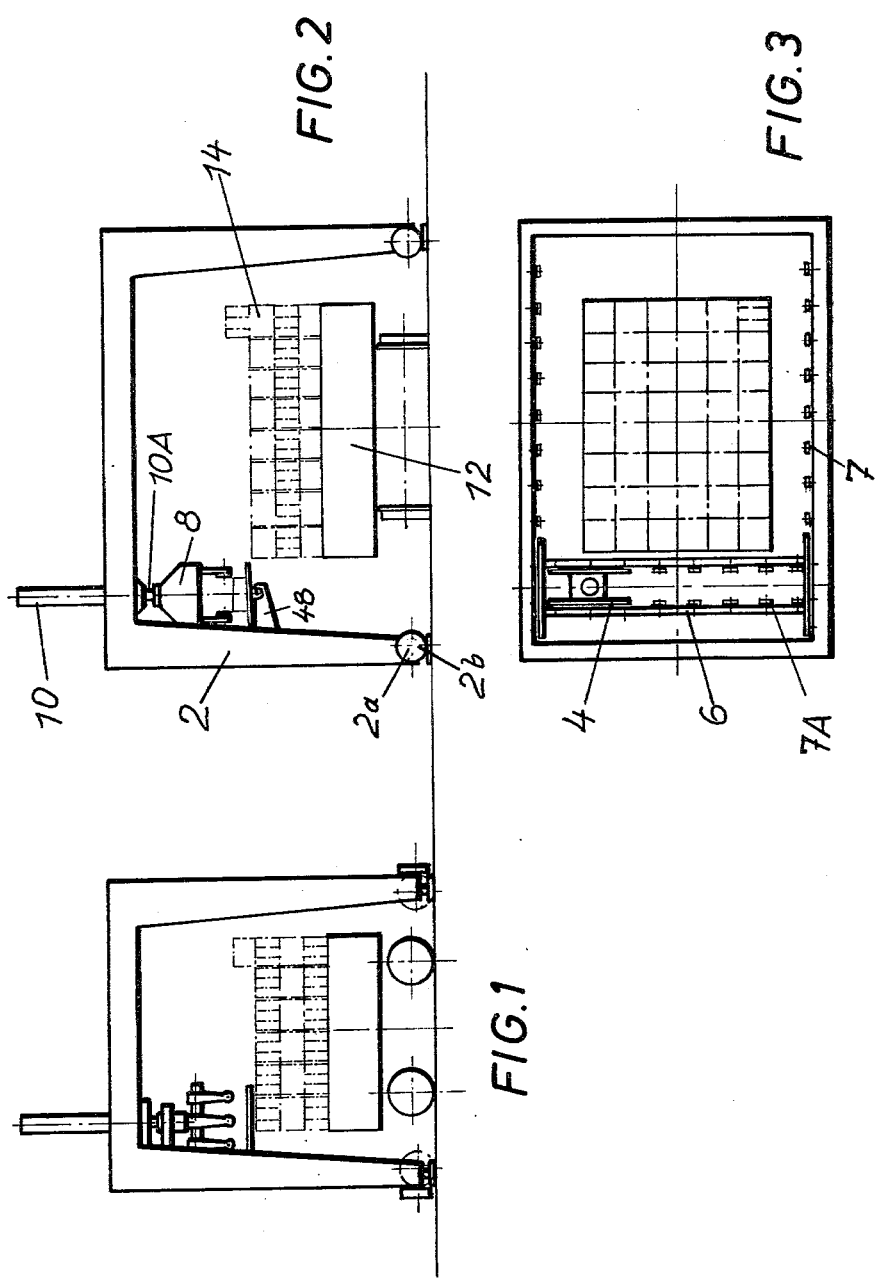

SETTING AND STACKING ARRANGEMENT

BACKGROUND OF THE INVENTION

The invention relates to a setting and stacking arrangement which includes a gripping mechanism rotatable about a vertical axis. The gripping mechanism is movable in a transverse and longitudinal direction and can be lifted and lowered as well and serves to set, respectively to stack objects, so that with this gripping mechanism a setting respectively a stacking in a cross bracing manner is made possible. The arrangement is particularly suitable for stacking and/or setting molded articles being fed from a ceramic press.

A setting and stacking arrangement of this type is already known and is described on page 325 of the publication entitled "Keramische Zeitschrift" No. 7/1976. This known arrangement has a conveyor belt mounted immediately adjacent to the pressing table of the ceramic press. This conveyor belt transports the pressed molded articles to a first gripper mechanism. The latter is mounted in a first elevator tower and serves to grip the stones or articles coming from the press and to turn them 90° about their longitudinal axis and to place them in this turned position on a further conveyor belt. This second conveyor belt then transports the turned molded articles into the operative region of a further gripping arrangement. This second gripping arrangement is mounted on a gantry-like frame and is movable on this frame in a transverse as well as in a longitudinal direction and can as well be lowered and lifted by the gantry-like frame and rotated about a vertical axis. In this manner it is possible to set the molded articles being transported by the second conveyor belt on, for example, a kiln vehicle and to stack them on this vehicle and to obtain thereby a better stability of the stone or article stack by stacking it in a cross-bracing manner. A significant drawback of this known setting and stacking arrangement resides in that at least two conveyor belts, two elevator towers, and two gripping mechanisms must be provided. Such an arrangement is therefore quite complex and costly. A further drawback resides in that the stones must be gripped, turned and transported several times. This is particularly disadvantageous when delicate not yet cured molded articles have to be handled, for example, the type consisting of a dry-pressed fireproof mass. Such molded articles are frequently damaged due to excessive handling. A further drawback of this known setting and stacking arrangement resides in that when the press is to be changed for a different type of molded article, a suitable adjustment of both conveyor belts and the elevator towers is necessary which requires the concomitant corresponding free space in the overall installation. A further drawback of this known setting and stacking arrangement resides in the necessity of the plural transfer and pick-up from one gripping mechanism to another and the necessity of traversing a considerable feed path length which lowers the overall output capacity of the arrangement.

SUMMARY OF THE INVENTION

It is the principal object of the invention to provide a setting and stacking arrangement of the type described hereinabove in which the drawbacks of the known setting and stacking arrangements are avoided. It is another object of the invention to provide a setting and stacking arrangement of simple construction which has a particularly high output capacity and occupies a reduced mounting space and in which damaging of the to be set and stacked articles during gripping and turning is avoided.

The advantages of the arrangement of this invention resides in particular in providing a rotatable gripping mechanism which can be moved in a known manner in a transverse or longitudinal direction and can be lifted and lowered as well and is rotatable about a vertical axis. The gripping mechanism has pairs of gripper arms which are movable along slides and the free ends of which have gripper plates that are rotatable by means of adjustable drive means. The slides are pivotably mounted in the gripper mechanism and therefore it is possible by means of pivotal, rotary and slidable movements to turn the molded articles being fed from a press about any desired predetermined angle, to rotate them, to pivot them and to set them in a corresponding manner, for example onto an oven car by means of a single gripper mechanism. For example, if the molded articles are to be stacked in a V-formation then it is generally necessary, to turn each successive storing position of the stones about 180° with respect to the preceding position of a stone to thereby stack in a wedge-shape or V-formation. Furthermore, it is necessary to take the wedge-angle into consideration during gripping and stacking. This is made possible with the gripping mechanism of this invention, so that all necessary handling motions of the to be set articles are possible with the gripping mechanism of the invention.

The not yet cured molded articles can be handled with the gripper mechanism of this invention in a particularly careful and delicate manner. For example, the holding force of the pairs of gripper arms is exerted via adjustable springs, and the opening motion of the pairs of gripper arms is the only motion that is carried out by means of hydraulic or pneumatic-piston-cylinder-units.

The pairs of gripper arms are mounted on parallel slides which are in turn slidable on further slides which are perpendicularly arranged with respect to the first parallel slides. By means of such an arrangement the formed molded articles can be stacked in a very narrow space independent from the position and distance between the formed molded articles as they leave the press.

A further particularly simple solution for the turning drive of the gripper plates resides in the provision of bendable shafts associated therewith. In view of the fact that the gripper plates need not carry out a rotational motion in excess of 360° it is not necessary to mount the bendable shafts in covers. Furthermore, these bendable shafts can be secured in parallel relationship to each other onto the drive shaft of the rotating drive means. In this manner the parallel bendable shafts carry out during a rotation of the drive shaft not only a rotational movement but also a translational movement. This translational movement does not affect the rotation of the gripper plates because the bendable shafts can follow this translational motion without any difficulties.

A further advantage of the arrangement of the invention can be seen in that the pivoting structure is formed as a trapezoidally shaped articulated quadrangle which gives it the possibility to position the turning axis of the pivot motion in that location which is most favorable for the stacking and setting of the articles. Under normal conditions the most favorable turning axis for the pivotal motion is a line which bisects the connecting lines of the turning axes of the gripper plates. In this manner it is avoided that the gripper plates carry out during pivoting a larger translational motion in the lateral direction.

By arranging the lifting and turning mechanisms with the thereto secured gripping mechanism on a sled it is possible to work with either a gantry-like structure that is arranged adjacent to the ceramic press, and which if necessary can be moved or to arrange the sled path pivotally about a vertical column in a manner of a radial boring machine, whereby it is possible, to expose the press, for example during changing the form of the molded articles, by simply the swinging away of the sled path.

Finally, it should be noted that a very substantial acceleration of the processing and a heightened output capacity of the setting and stacking arrangement in accordance with the invention is attained in such a way that the lifting and lowering motions of the gripping mechanism is reduced to a minimum. This is attained by making the height of the pressing table of the ceramic press correspond to the highest position of a set stone in the middle of the stack when it is mounted in the stacking arrangement. This means that the stacking arrangement only needs to carry out a reduced lifting and lowering motion when gripping the molded articles.

BRIEF DESCRIPTION OF THE DRAWING

The invention is set forth in the following detailed description taken in conjunction with the appended drawing, in which:

FIG. 1 is a schematic side view of the setting and stacking arrangement of the invention;

FIG. 2 is a schematic front view of the setting and stacking arrangement of the invention;

FIG. 3 is a schematic plan view of the setting and stacking arrangement of the invention;

DETAILED DESCRIPTION

Figure 4:
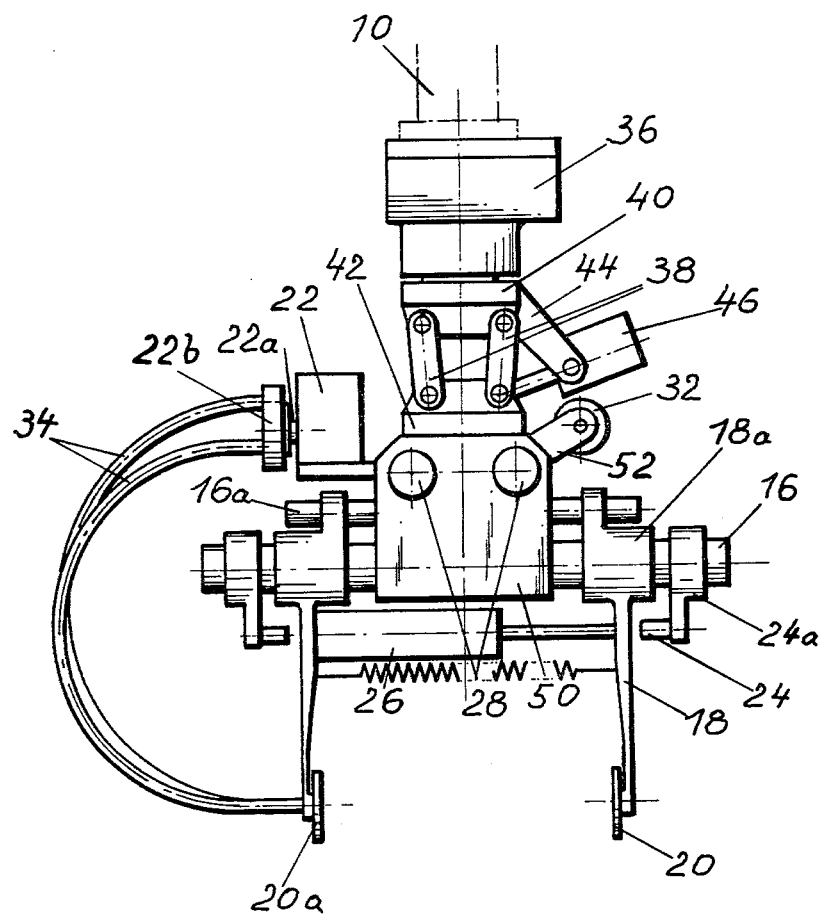
FIG. 4 is a front view, in an enlarged scale, of the gripping mechanism.

As can be noted from FIGS. 1-3 there is mounted in the vicinity of a non-illustrated ceramic press a gantry-like structure 2 which is mounted in its operative position on two supporting blocks 2b which can, however, be lifted up so that the gantry-like construction 2 is supported on two wheels 2a on which it can be moved.

A sled 4 is slidably mounted on a slide 6 which itself is in turn movable on suitable slide guides mounted on the gantry-like structure 2. The slide guides, respectively the slide guide path, are constructed as rollers 7 rotatably mounted at short distances from each other on each side of the gantry-like structure 2. Rollers 7a are also mounted in a similar manner on the slide 6, as can be noted from FIG. 3. Such an arrangement avoids a jamming of the sled 4 and slide 6 due to an accumulation of dirt and debris along their respective paths of movement. The sled 4 serves as a carriage for a lifting mechanism 10 in the form of a lifting cylinder and piston unit. The lifting cylinder and piston unit 10 has a piston rod 10a on which there is secured a gripping mechanism 8 which is illustrated in greater detail in FIGS. 4 and 5. The gripping mechanism 8 is movable over the entire region of the loading surface of a kiln car 12 in order to set a stack 14 in a cross-bracing manner as illustrated in FIGS. 1-3. In order to attain the highest possible stacking capacity of the setting and stacking arrangement it is necessary to carry out all operative motions at a maximum possible velocity and to avoid any unnecessary motions. For this reason the pick-up of the molded articles coming from the press by means of the gripping mechanism 8 is carried out from a table, which in the illustrated example is the lifting table 48, the height of which corresponds to the highest stone or article position in the stack 14. In this manner it is possible to avoid the requirement that the lifting arrangement carries out when gripping the formed molded articles a lifting motion so that at worst only a very small lifting motion respectively lowering motion for the lifting arrangement is necessary.

If spatial conditions permit it the non-illustrated ceramic press can be arranged immediately adjacent to the gantry-like structure 2 so that the press table is situated at the same height then the illustrated lifting table 48, thereby requiring only a transfer of the molded articles into the operative region of the gripping mechanism 8.

If the spatial conditions are such that this is not possible, then the lifting table 48 is constructed so that it is movable between the height of the pressing table and the height of the gripping mechanism 8.

After the molded articles have been gripped at the lifting table 48 they are turned by means of the gripping mechanism 8 in accordance with their shape, they are then pivoted and directed in a preselected direction and can be stacked in the illustrated manner on the oven car 12.

Figure 5:
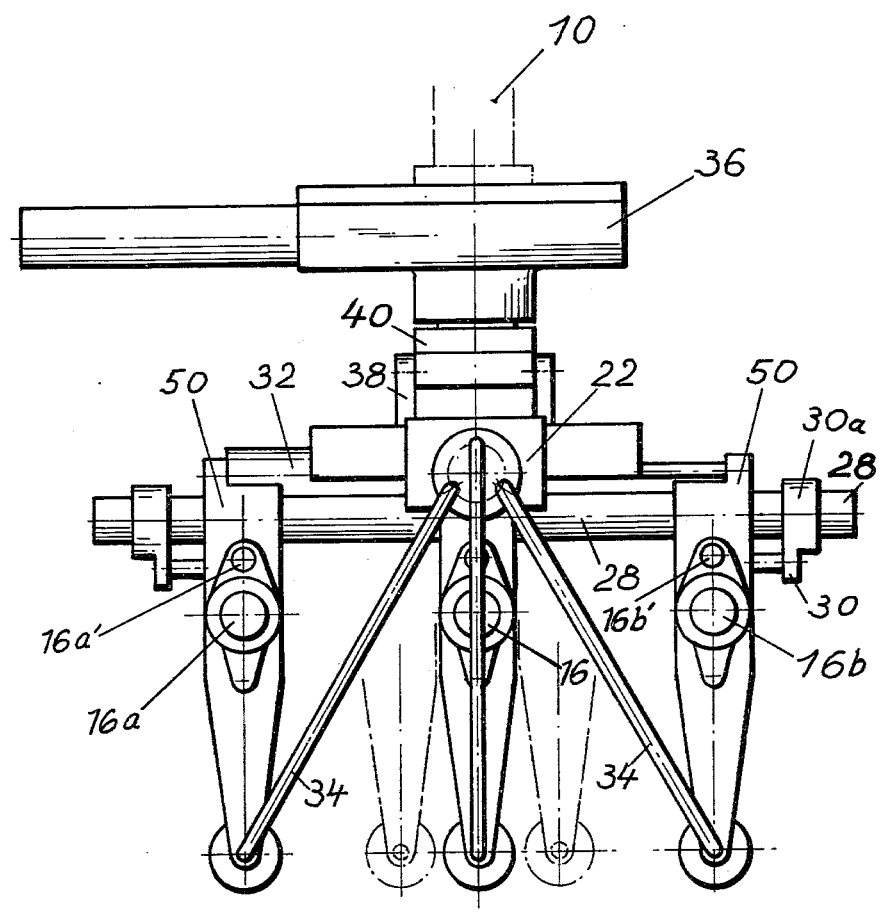
FIG. 5 is a side view, also in an enlarged scale, of the gripping mechanism illustrated in FIG. 4.

FIGS. 4 and 5 illustrate in greater detail the gripping mechanism 8 so that the manner in which the different functions of the gripping mechanism are carried out becomes more apparent.

As can be noted there are slidably mounted as many gripper arm pairs 18 on the slides 16 as many molded articles are to be gripped. In the illustrated embodiment there are provided three gripper arm pairs 18. These gripper arm pairs 18 are slidably mounted by means of guide sleeves or bushings 18a on the already aforementioned slide 16 which is embodied as two parallelly arranged rods 16a, 16b. Thinner guide rods 16a', 16b' are mounted parallel to the rods 16a, 16b and these rods 16a', 16b' prevent a rotation of the bushings 18a on the guide rods 16 and maintain these bushings 18a parallel relative to each other during their motion along the guide rods 16a, 16b. The slidable motion of the guide bushings 18a on the guide rods 16a, 16b is limited in an exterior direction by means of clamping rings 24a which has limit stops 24 mounted thereon. The slidable movement of the guide bushings 18a with the pairs of gripper arms 18 mounted thereon is carried out by means of a hydraulic-respectively pneumatic-cylinder unit 26 mounted between the pairs of gripper arms 18. A movement in the opposite direction is carried out by a non-illustrated spring, which produces the holding force for the articles carried by the gripper arm pair 18. On the free ends of the gripper arms of each pair 18 there are mounted rotatable gripper plates 20, 20a. The articles which are to be set and stacked are held between these gripper plates 20, 20a. At least the gripper plate 20a of a pair of gripper arms 18 can be rotated by means of a rotary drive unit 22. The rotary motion angle is adjustable and controlled at the rotary drive unit 22 and this rotation can encompass an angle falling between 0° and 360°. The rotary drive unit 22 includes a hydraulic or a pneumatic piston-cylinder unit with transmission gears (not illustrated in detail) which transforms the rectilinear motion into a rotary motion for the drive shaft 22a extending from the unit 22. A drive disc 22b is coaxially fastened to the drive shaft 22a. Flexible cables or shafts 34 are provided between the drive disc 22b and the gripper plate 20a and these cables 34 are fastened to both the drive disc 22b and to the gripper plate 20a. When the drive disc 22b is rotated, the ends of the flexible cables 34 which are fastened to the drive disc 22b carry out a corresponding rotary motion as well as an additional translational motion. The rotary motion is transferred correspondingly to the gripper plate 20a, whereas the translational motion is absorbed by the bendable shafts represented by the flexible cables 34. In this way it is possible to carry out a satisfactory transmission of rotary motion without providing an additional drive mechanism for the different flexible shafts 34. It is not even necessary to provide a guide cover for the flexible shafts 34. In addition thereto it is possible, as a result of using the flexible shafts 34, to move the pairs of gripper arms 18 in their axial direction along the guide rods 16 as well as transversely with respect to this latter direction.

There are rigidly mounted between the pairs of gripper arms 18 on the guide rods 16 guide and holding plates 50. Two parallel guide rods 28 extend transversely through mating holes in the guide and holding plates 50. As stated hereinbefore there are provided in the illustrated embodiment three pairs of gripper arms 18. Each pair of gripper arms 18 is slidably mounted on a guide rod 16a, 16b and each guide rod 16a, 16b is secured to a guide and holding plate 50. The middle guide and holding plate 50 is rigidly connected with the guide rods 28, whereas the outer guide and holding plates 50 are slidably mounted on the guide rods 28.

The slidable movement of the outer guide and holding plates 50 on the guide rods 28 is limited by the adjustable limit stops 30 which are mounted by means of the clamping rings 30a on the guide rods 28. The slidable movement of the outer guide and holding plates 50 on the guide rod 28 are effected by means of the hydraulic-or pneumatic-piston-cylinder-unit 32. As can be noted from FIG. 5 the outer pairs of gripper arms 18, fastened to the outer guide and holding plates 50 via the guide rods 16a, 16b, can be moved between the position shown in dot-dashed lines and the outermost position shown in full lines.

The middle guide and holding plate 50 which is rigidly secured to the guide rod 28 is provided at its upper side with a transversely arranged plate 42. This plate together with a parallel arranged plate 40 and linkages 38, respectively pivotally secured to the plates 40 and 42 form a trapezoidally shaped and pivotally linked quadrilateral or quadrilaterals. This linked quadrilateral 38, 40, 42 forms the pivot guide for the gripping mechanism, whereby the non-parallel links 38 are inclined relative to each other at such an angle that a plane bisecting the angle formed between the linkages 38 bisects the line joining the rotary axes of the gripper plates 20, 20a perpendicularly. In this manner there is attained that the pivot motion of the gripper mechanism is carried out about an axis which coincides with the connecting line of the rotary axes of the gripper plates 20, 20a. The pivot motion is affected by means of a hydraulic-pneumatic-piston-cylinder-unit 46 which is, on the one hand, linked to a cantilevered beam 44 extending from the plate 40 and, on the other hand, is linked to the plate 40. The plate 40 is secured to a rotating drive mechanism 36 which itself is secured to the piston rod 10a of the lifting cylinder 10.

As can be noted, the setting and stacking arrangement of this invention can perform the following operations:

It can grip in a careful manner the molded articles coming from the ceramic press, it can turn, pivot and maintain the molded articles at a predetermined distance, so that they can be lifted respectively lowered and be shifted in a transverse respectively longitudinal direction, and so that a careful and conservative stacking respectively setting of the molded articles on a kiln car in a cross-bracing manner is possible, without it being necessary to set and deposit the formed molded articles on an intermediate transportation means on the way from the ceramic press on the kiln car.

Although the invention is illustrated and described with reference to a plurality of preferred embodiments thereof, it is to be expressly understood that it is in no way limited to the disclosure of such a plurality of preferred embodiments, but is capable of numerous modifications within the scope of the appended claims.

What is claimed is:

1. An improved setting and stacking arrangement including a gripping mechanism movably mounted in said arrangement in a transverse and longitudinal direction and up and down in a vertical direction and rotatably about a vertical axis for gripping, setting and stacking articles in a cross-bracing manner, particularly molded articles being supplied from a ceramic press, the improvement in said arrangement comprising
at least one first guide rod operatively mounted in said arrangement,
at least one pair of gripper arms slidably movably mounted on said first guide rod,
at least one rotary gripper plate respectively operatively mounted at the free end of one arm of said pair of gripper arms, and
rotary drive means operatively connected to said rotary gripper plate for rotating same about a preselected angle, said first guide rod being pivotally mounted in said automatic setting and stacking arrangement.

2. The improved setting and stacking arrangement as set forth in claim 1, wherein said first guide rod has limit stop means mounted at opposite ends thereof, said pair of gripper arms being slidably movable on said first guide rod between said limit stop means, a first hydraulic or pneumatic-piston-cylinder unit operatively mounted between said pair of gripper arms and operatively connected thereto, said first pneumatic or hydraulic-piston-cylinder unit being adapted to move said pair of gripper arms on said first guide rod toward said limit stop means against the action of a spring connected to said pair of gripper arms.

3. The improved setting and stacking arrangement as set forth in claim 1, wherein there are two first parallel guide rods, a first support means slidably movably mounted in said arrangement, said two first parallel guide rods being supported on said first support means and said pairs of gripper arms being slidably movable on said two first guide rods in a direction perpendicular to the movement of said first support means in said arrangement.

4. The improved setting and stacking arrangement as set forth in claim 3, wherein there are three first parallel guide rods, at least one second guide rod disposed perpendicularly relative to said first three guide rods, said first support means being slidably movable on said second guide rod, the middle one of said first three parallel guide rods being rigidly mounted on said first support means whereas the outer guide rods of said first three parallel guide rods being slidably movable relative to said first support means, and a second pneumatic or hydraulic-piston-cylinder unit being operatively connected to said outer guide rods for slidably moving them.

5. The improved setting and stacking arrangement as set forth in claim 4, wherein both arms of said pair of gripper arms have a rotary gripper plate rotatably mounted at the free ends thereof, one of said gripper plates being operatively connected to said rotary drive means.

6. The improved setting and stacking arrangement as set forth in claim 5, wherein said rotary drive means includes at least one flexible shaft connected to said one gripper plate, said first support means comprising three plates each of which supports one of said first guide rods, the middle one of said three plates being fixed on said second guide rod whereas the outer plates being slidably movable therein, said rotary drive means being supported on said middle plate.

7. The improved setting and stacking arrangement as set forth in claim 6, wherein said rotary drive means include a drive shaft, a disc coaxially mounted on said drive shaft, and a pair of parallel flexible shafts secured to said disc.

8. The improved setting and stacking arrangement as set forth in claim 7, wherein said parallel flexible shafts are radially equidistantly disposed on said disc from the center thereof.

9. The improved setting and stacking arrangement as set forth in claim 8, including second support means which include at least one pivotally linked quadrilateral structure having two generally parallelly disposed linkages and generally converging linkages, combination lifting and rotating means operatively mounted in said automatic stacking and setting arrangement, said second support means being connected, on the one hand, to said combination lifting and rotating means and, on the other hand, to said first support means, the plane bisecting the angle between said converging linkages generally bisecting the line joining the axes of said gripper plates.

10. The improved setting and stacking arrangement as set forth in claim 9, wherein the lower one of said two parallelly disposed linkages forms the lower end of said combination lifting and rotating means and the upper one of said two parallelly disposed linkages has a cantilevered projecting member, a third pneumatic or hydraulic-piston-cylinder unit pivotally connected, on the one hand, to said cantilevered projecting member, and, on the other hand to said lower one of said two parallelly disposed linkages.

11. The improved setting and stacking arrangement as set forth in claim 10, wherein third supporting means are included in said arrangement, said combination lifting and rotating means being movable on said third support means in a one direction, fourth support means, said third support means being movably mounted on said fourth support means.

12. The improved setting and stacking arrangement as set forth in claim 11, wherein said fourth support means is formed as a gantry-like structure having roller supports which permit the moving of said gantry-like structure.

13. The improved setting and stacking arrangement as set forth in claim 12, including a press table and wherein the highest article of the articles adapted to be stacked by the automatic setting and stacking arrangement corresponds substantially in height to said table of the ceramic press which supplies the articles.

14. The improved setting and stacking arrangement as set forth in claim 13, wherein said ceramic press table is vertically movably mounted in said gantry-like structure.

* * * * *